No. 855,909. PATENTED JUNE 4, 1907.
J. STAUB.
STARTING MECHANISM FOR HYDROCARBON ENGINES.
APPLICATION FILED AUG. 28, 1905.
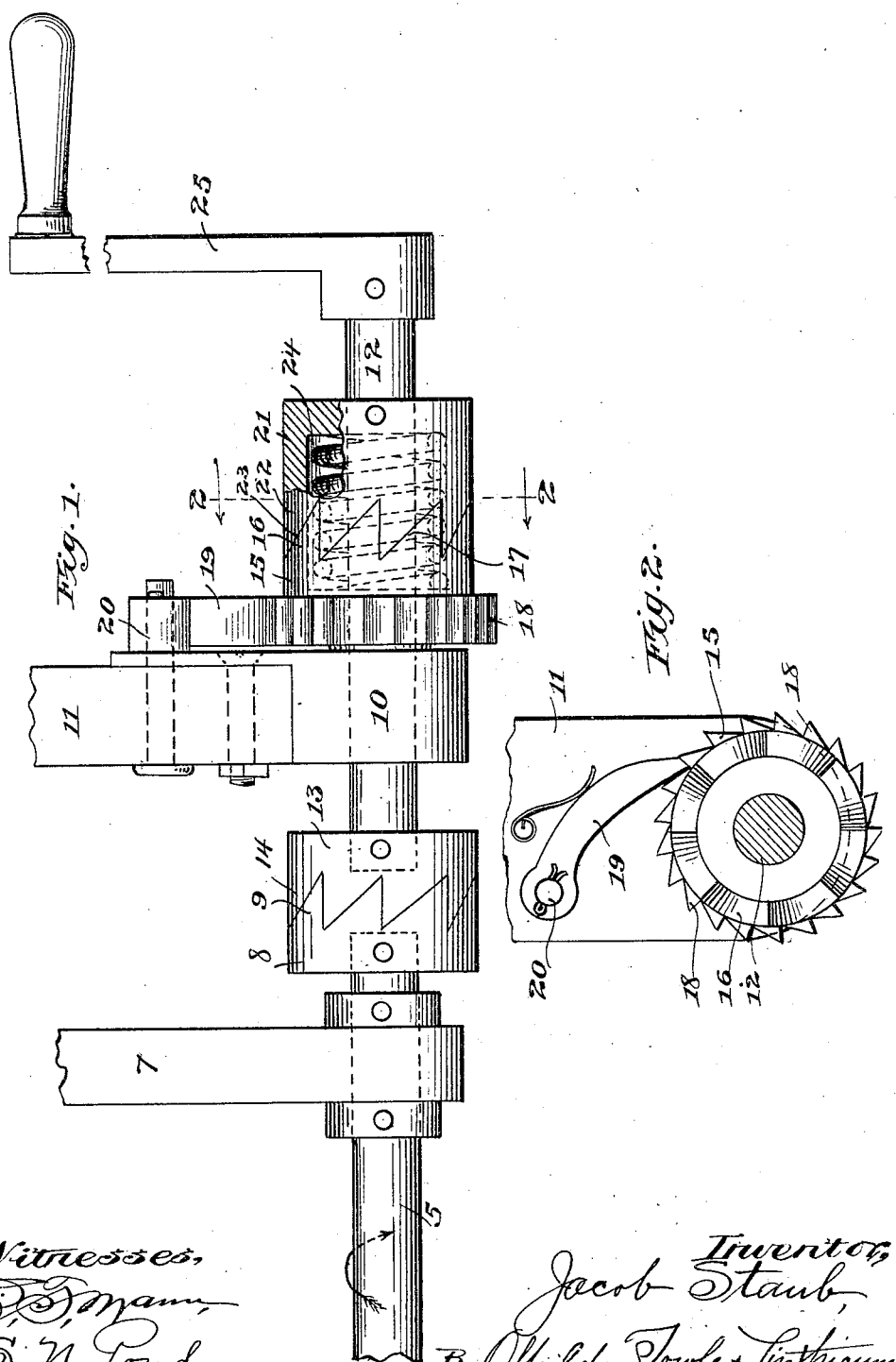
Witnesses,
Inventor,
Jacob Staub,
By Offield, Towle & Linthicum
Attys.

UNITED STATES PATENT OFFICE.

JACOB STAUB, OF HINSDALE, ILLINOIS, ASSIGNOR OF ONE-HALF TO WILLIAM ROBBINS, OF HINSDALE, ILLINOIS.

STARTING MECHANISM FOR HYDROCARBON-ENGINES.

No. 855,909.  Specification of Letters Patent.  Patented June 4, 1907.

Application filed August 28, 1905. Serial No. 276,147.

*To all whom it may concern:*

Be it known that I, JACOB STAUB, a citizen of the United States, residing at Hinsdale, in the county of Dupage and State of Illinois, have invented certain new and useful Improvements in Starting Mechanisms for Hydrocarbon-Engines, of which the following is a specification.

This invention relates to starting devices for hydrocarbon engines, being especially useful as a safety starting crank for such engines when employed as motors for automobiles and similar self-propelled vehicles. It is well known that a source of danger to the operator resides in the means commonly employed for starting such engines, arising out of the fact that, owing to imperfect sparking or poor adjustment of the parts, the charge is sometimes ignited prematurely relatively to the piston stroke, resulting in a reverse or backward movement of the engine shaft and of the starting crank, which latter is liable to injure the operator before it can be disengaged from the engine shaft. To remedy this fault and eliminate the danger above mentioned, several safety starting cranks have been heretofore proposed designed to disengage the starting crank from the engine shaft under a turning movement of the latter in either direction; and the object of the present invention is to provide an improved and simplified mechanism of this latter class which shall insure the certain separation of the starting crank from the engine shaft under such a slight extent of backward movement of the latter as shall prevent danger of injury to the operator.

To this end my invention consists in a new and improved safety starting mechanism substantially as hereinafter described and more particularly pointed out in the claims.

My invention, in an approved mechanical form, is illustrated in the accompanying drawing, wherein,—

Figure 1 is a side elevational view of the mechanism; and Fig. 2 is a cross-sectional view in the line 2—2 of Fig. 1, with certain parts omitted for sake of clearness.

Referring to the drawing, 5 may designate one end portion of the engine shaft shown as mounted in a suitable journal 6 formed in a portion of a supporting frame 7. To the end of the engine shaft is secured a clutch member in the form of a collar 8, on the outer face of which is an annular series of clutch teeth 9. Rotatably mounted in a journal block 10 secured to and depending from another frame member 11 is the starting shaft 12, said shaft being disposed in endwise alinement with the engine shaft 5, and being capable of endwise bodily movement. On the inner end of the starting shaft 12 is secured a clutch member in the form of a collar 13 having an annular series of clutch teeth 14 co-operating with clutch teeth 9 of the clutch 8. Loosely mounted on the starting shaft 12 is a shaft-separating member in the form of a collar 15 that is provided on its outer face with an annular series of clutch teeth 16 having inclined cam surfaces 17. Said collar also has formed thereon an annular ratchet 18 (Fig. 2) the teeth of which co-operate with a spring-pressed detent 19 that is pivoted by a pivot-pin 20 to the frame member 11; said detent preventing the rotation of the clutch 15 in a direction corresponding to the backward movement of the engine shaft, but permitting its rotation in the opposite direction represented by the arrow in Fig. 1, indicating the forward direction of rotation of the engine shaft. Secured to the starting shaft 12 is a co-operating shaft-separating clutch member comprising a collar 21 having on its inner face a series of clutch teeth 22 which are formed with inclined or cam surfaces 23 that co-operate with the inclined or cam surfaces 17 of the teeth 16. A coil spring 24 interposed between the clutch members 15 and 21 normally tends to disengage them, as also to disengage the clutch members 8 and 13. On the outer end of the starting shaft 12 is mounted the usual starting crank 25.

Normally the clutch members 8 and 13, and 15 and 21 lie separated by the spring 24. When the engine is to be started up, the operator seizes the handle 25 and imparts an inward thrust upon the starting shaft in opposition to the spring 24, thereby carrying the clutch members 8 and 13, and 15 and 24 into engagement, as shown in Fig. 1, whereupon, upon turning the crank in the direction necessary to start the engine, the shaft of the latter is started in rotation. Upon releasing the hold upon the crank 25 the spring 24 instantly disengages the clutch members, or such disengagement may be effected earlier by the engine shaft running in advance of the starting shaft and forcing the latter outwardly through the action of the cam inclines on the teeth of the clutch members 8 and 13. If, however, the engine shaft should start up in the backward or reverse direction, the starting shaft 12 will be given a slight backward rotation simultaneously with an outward bodily movement, owing to the engagement of the inclined sides 23 of the shaft-separating collar 21 with and upon the similar inclined sides 17 of the shaft-separating collar 15, which latter is held against backward movement by the detent 19. In this manner and by this means a complete separation and disengagement of the main clutch members 8 and 13 may be effected, upon a fractional backward rotation of the engine shaft corresponding to the width of the clutch teeth.

Variations and modifications in respect to details may be made by those skilled in the art without departing from the principle of the invention as hereinabove disclosed, or sacrificing any of the advantages thereof.

I claim:

1. In a starting mechanism for hydrocarbon engines, the combination with a clutch member fast on the engine shaft, of a rotatably mounted endwise movable starting shaft carrying a co-operating clutch member, and a pair of shaft-separating members mounted on said starting shaft and provided with co-operating cam surfaces whereby they are separated by a relative turning movement between them, one of said shaft-separating members being secured against both rotary and sliding movement on said starting shaft and the other being rotatably mounted on said starting shaft and provided with means preventing its rotation in one direction, substantially as described.

2. In a starting mechanism for hydrocarbon engines, the combination with a clutch member fast on one end of the engine shaft, of a rotatably mounted endwise movable starting shaft disposed in longitudinal alinement with said engine shaft and carrying a co-operating clutch member, a pair of shaft-separating collars mounted on said starting shaft and provided with co-operating cam surfaces whereby they are separated by a relative turning movement between them, one of said collars being secured against both rotary and sliding movement on the starting shaft and the other being rotatably mounted on said starting shaft and provided with means preventing its rotation in one direction, and a spring normally tending to disengage said collars, substantially as described.

3. In a starting mechanism for hydrocarbon engines, the combination with a clutch member fast on one end of the engine shaft, of a rotatably mounted endwise movable starting shaft disposed in longitudinal alinement with said engine shaft and carrying a co-operating clutch member, a shaft-separating clutch member loosely mounted on said starting shaft, an annular ratchet carried by said shaft-separating clutch member, a detent co-operating with said annular ratchet to permit rotation of said shaft-separating clutch member in the forward direction of rotation of the engine shaft, but preventing its turning movement in the opposite direction, another shaft-separating clutch member fast on said starting shaft, and a spring normally tending to disengage said shaft-separating clutch members, substantially as described.

JACOB STAUB.

Witnesses:
SAMUEL N. POND,
FREDERICK C. GOODWIN.